United States Patent

Bach

[19]

[11] Patent Number: 6,082,169
[45] Date of Patent: Jul. 4, 2000

[54] METHOD FOR DETECTING WATER METER MALFUNCTION, CALCULATING THE DURATION THEREOF, AND DEVICE FOR IMPLEMENTING SAME

[75] Inventor: Guy Bach, Schweighouse, France

[73] Assignee: Societe Anonyme de Production de Procedes de Comptage de l'Eau et Autres Liquides, SAPPEL, Saint-Louis, France

[21] Appl. No.: 09/142,866

[22] PCT Filed: Apr. 17, 1997

[86] PCT No.: PCT/FR97/00694

§ 371 Date: Sep. 17, 1998

§ 102(e) Date: Sep. 17, 1998

[87] PCT Pub. No.: WO97/40351

PCT Pub. Date: Oct. 30, 1997

[30] Foreign Application Priority Data

Apr. 19, 1996 [FR] France ................................. 96 04929

[51] Int. Cl.[7] ..................................................... G01F 25/00
[52] U.S. Cl. .............................. 73/1.34; 73/1.27; 702/100
[58] Field of Search ..................... 73/1.27, 1.34; 702/100

[56] References Cited

U.S. PATENT DOCUMENTS 4,286,471  9/1981  Lee et al. ............................... 73/861.84

FOREIGN PATENT DOCUMENTS

| 132167 | 1/1985 | European Pat. Off. . |
| 288448 | 10/1988 | European Pat. Off. . |
| 2458795 | 1/1981 | France . |
| 3811946 | 10/1989 | Germany . |

*Primary Examiner*—Thomas P. Noland
*Attorney, Agent, or Firm*—Young & Thompson

[57] ABSTRACT

A method for detecting water meter malfunction and calculating the duration thereof, includes measuring the average flow rate for each volume unit detected after the preceding volume unit, comparing this average flow rate with two limit flow rates which are a first flow rate corresponding to the minimal flow rate when the meter is operating normally and a second flow rate corresponding to the minimal flow rate when the meter is operating defectively, calculating, when an average flow rate is found to be higher than the first flow rate, the relation between the sum of recorded volume units between the two flow rates and the sum to which is added the sum of volume units recorded at flow rates higher than the second flow rate, starting a clock when this relation is lower than a defectiveness threshold and stopping it when the relation is once more higher than the said threshold.

7 Claims, 1 Drawing Sheet

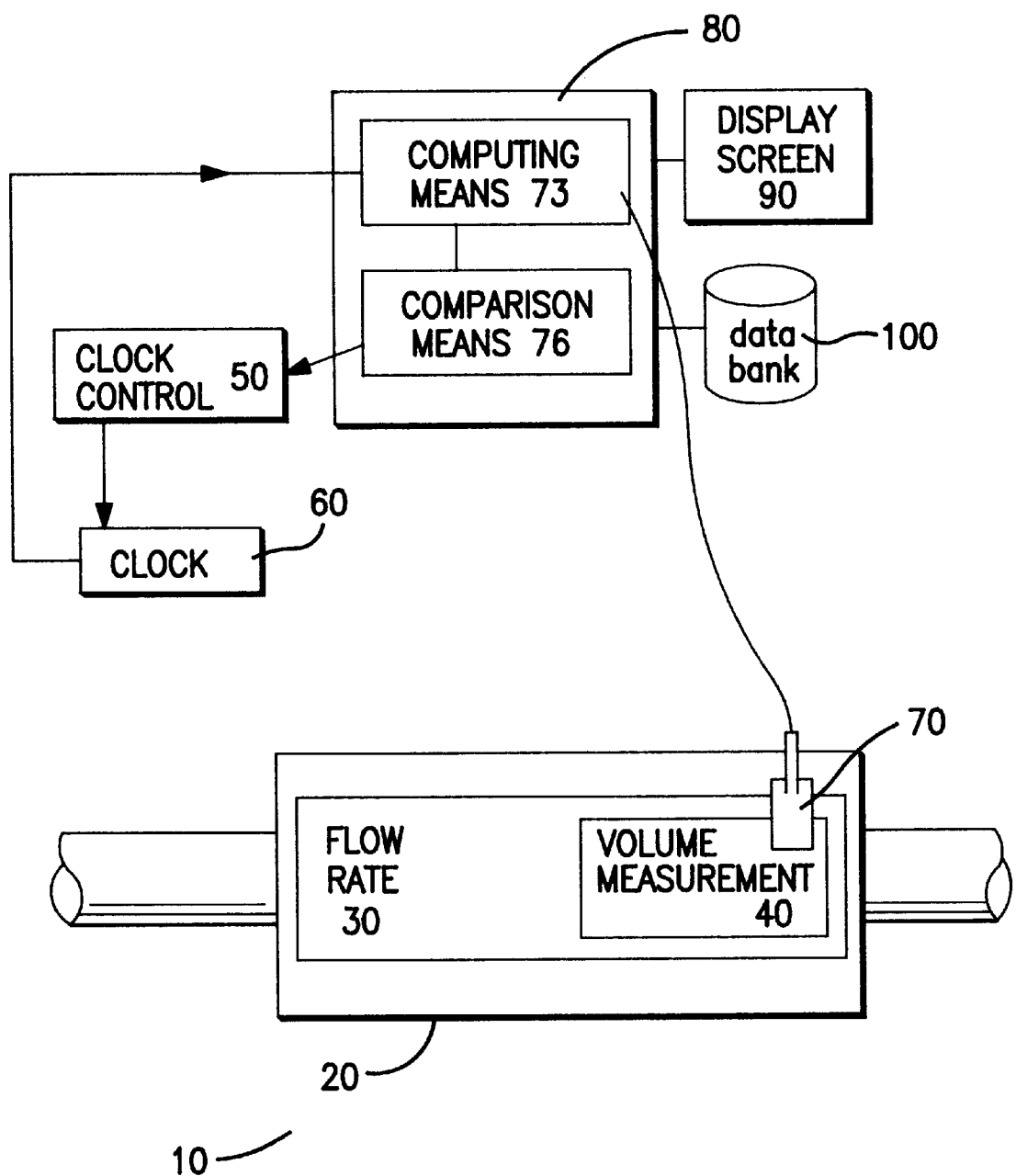

METHOD FOR DETECTING WATER METER MALFUNCTION, CALCULATING THE DURATION THEREOF, AND DEVICE FOR IMPLEMENTING SAME

BACKGROUND OF THE INVENTION

The invention relates to a process for the detection and evaluation of the duration of a malfunction of a meter, particularly when said meter operates in the form of a so-called submarine meter.

DESCRIPTION OF THE RELATED ART

It has been noted that in the course of the use of a water meter, the precision of the latter can decline because of wear even of the meter or from the deposit of solid particles such as sand, in particular during work on the pipes.

Most of the time, this decline is manifested in the incapability of the water meter to measure low flow rates and also gives rise to erroneous measurements of higher flow rates. This decline being difficult to detect, there results an erroneous measurement of water consumption. Moreover, the simple detection of the malfunction of a meter does not permit evaluating the duration of said malfunction and as a result to estimate the erroneous measurement of consumption.

Moreover, when the malfunction of the water meter is due to the deposit of solid particles, for example following work, said deposit can be naturally eliminated. Thus, the flow of water flowing through the meter will gradually entrain the solid particles, restoring the meter to its normal condition. Because of this, this type of malfunction can pass entirely undetected, the meter having lost and regained its normal operating characteristics without this having been detected.

This type of malfunctioning meter is called a submarine meter to the extent that its malfunction is practically undetectable and the indications given are less than those that are normal.

It is therefore desirable to overcome these draw-backs by providing a process for the detection of the malfunction of a water meter also permitting evaluation of the time during which said meter has operated as a submarine meter.

BRIEF DESCRIPTION OF THE DRAWING

The single drawing FIGURE illustrates the invention.

SUMMARY OF THE INVENTION

To this end, the invention provides a process for the detection of the malfunction of a water meter and for evaluation of the duration of said malfunction, characterized in that it comprises: measuring the mean flow rate at each unit of volume detected following the preceding unit of volume, comparatively analyzing this mean flow rate at two limit flow rates which are a first flow rate corresponding to the minimum normal operating flow rate of the meter and a second flow rate corresponding to the minimum operating flow rate of the meter when the meter is functioning in a submarine mode, the computing, when a mean flow rate is detected greater than the first flow rate, of the ratio between the sum of the units of volumes counted between the first and the second flow rates and this said sum to which is added the sum of the units of volumes counted at flow rates higher than the second flow rate, starting a clock when this ratio is below a threshold of submarine operation and stopping said clock when the ratio is again greater than the submarine threshold.

When the mean flow rate calculated is detected to be below the minimum flow rate of normal operation of the meter, said mean flow rate is not taken into account because it does not reflect any significant event.

When the calculated mean flow rate is detected to be higher than the minimum flow rate of normal operation of the meter, there is then performed an analysis of detection of said operation of a meter operating in a submarine mode.

Thus, there are separately added the units of volume counted between the minimum normal operating flow rate of the meter and the minimum operating flow rate of the meter when the meter is in a submarine mode, and the units of volume counted at flow rates higher than the minimum flow rate of the meter when the meter is operating in a submarine mode.

There can thus be calculated the value of the ratio between the volumes counted between the two flow rates and the sum of the volumes counted between the two flow rates and the volumes counted above the minimum operating flow rate of the meter when operating in a submarine mode.

The obtained value is then compared to a value of this ratio below which the meter operates in the submarine mode.

When a value of this ratio is detected such that the meter functions in a submarine mode, a clock is started and when the value of the ratio is detected such that the detector operates normally, the clock is stopped.

There is thus detected not only the malfunction of the meter operating in a submarine mode but also in a precise manner the duration of this malfunction.

So as to preserve high sensitivity of the analysis carried out, only the most recent units of volume are processed by a so-called "sliding window" technique.

The invention also relates to a device 10 for detecting malfunction of a water meter 20 operating in a submarine mode and for evaluation of the duration of said malfunction according to the process of the invention, characterized in that it comprises means for measuring flow rates 30 in the water meter 20, means to measure a first volume of water 40 at a flow rate comprised between a minimum normal operating flow rate of the meter 20 and a minimum flow rate of the meter 20 operating in a submarine mode, and a second volume of water at a flow rate higher than said second flow rate and means 50 for starting and stopping a clock 60.

Preferably, the means for measuring the flow rates 30 in the water meter are constituted by means for measuring units of volume 40 passing through the water meter constituted by a first electric impulse emitter 70 disposed in the meter and delivering an impulse upon each volume flowing.

The computing means 73 and analysis means 76 are constituted by an electronic computer 80.

This electronic computer can comprise a display screen 90 on which are displayed the results of the measurements carried out. The computer can also be connected to a data bank permitting computerized retrieval of the results.

DESCRIPTION OF THE PREFERRED EMBODIMENT

The invention will now be described in greater detail with the help of an example of embodiment in which there is used an emitter of electrical impulses to input the electronic computer.

A flow rate is defined by the time separating two consecutive impulses. Thus, the minimum normal operating flow rate of the computer D1 and the minimum operating flow rate of the computer D2 when operating in a submarine mode, are defined by two variables T1 and T2 defining a number of periods of 4 seconds.

The electronic computer, as a function of the data received from the electrical impulses of the emitter, deter mines the values of the first volume V1 that has flowed at a flow rate comprised between D1 and D2 and of the second volume V2 at a flow rate greater than D2.

A threshold of submarine mode is obtained by the value of the following ratio:

$$V1/(V1+V2)=k/256$$

As to the processing of the "sliding window", there will then be deducted a quantity k from the volume V1 and a quantity 256-k from the volume V2, when (V1+V2)>VL Thus, a meter will be operating in submarine mode if:

$$256*V1-k*(V1+V2)<0$$

In these computational formulae, k is a quantity permitting defining a percentage and VL corresponds to the limit volume in liters.

All these values are reprogrammable. The modification of these parameters involves necessarily a restarting of V1 and V2 from zero, however VL must be able to be modified without resetting V1 and V2 to zero.

Upon each new electrical impulse from the electrical impulse emitter, it is thus necessary to update V1 and V2 to verify that the meter is not operating in a submarine mode. In the case in which the meter is determined to be operating in a submarine mode, the clock is started so as to count the duration of operation of the meter in a submarine mode. When the meter is no longer detected to be operating in a submarine mode, the clock is stopped and it has thus been possible to determine the length of time of malfunction of the meter operating in a submarine mode.

What is claimed is:

1. Process for the detection of malfunction of a water meter and for evaluation of the duration of said malfunction, comprising the steps of:

measuring the mean flow rate of each unit of volume detected following the preceding unit of volume, comparatively analyzing this mean flow rate at two limit flow rates which are a first flow rate corresponding to minimum normal operating flow rate of the meter and a second flow rate corresponding to the minimum operating flow rate of the meter when the meter is operating in a submarine mode, computing, when a mean flow rate is detected higher than the first flow rate, the ratio between the sum of the units of volume (V1) counted between the first and the second flow rates and this said sum to which is added the sum of the units of volume (V2) counted at flow rates higher than the second flow rate, starting a clock when this ratio is below a threshold of submarine operation and stopping said clock when the ratio is again higher than this threshold of submarine operation.

2. Process according to claim 1, characterized in that the measurement of the mean flow rate detecting a value of the flow rate below said first flow rate reflects the absence of an event.

3. Device for the detection of malfunction of a water meter operating in a submarine mode and the evaluation of the duration of said malfunction according to the process of claim 1, comprising means for measuring units of volume passing through the water meter, means for computing a mean flow rate, means for comparing the flow rate measured by said measuring means with a minimum normal operating flow rate of the meter and a minimum operating flow rate of the meter operating in a submarine mode, means for computing, when a mean flow rate is detected higher than the minimum normal operating flow rate of the meter, the ratio between the sum of the units of volume (V1) counted between the first and second flow rates and this sum to which is added the sum of the units of volume (V2) counted at flow rates higher than the second flow rate, means for comparing said ratio to a threshold of submarine operation and means for stopping and starting a clock as a function of the performed comparison.

4. Device according to claim 3, characterized in that the means for measuring the units of volume passing through the water meter are constituted by an emitter of electrical impulses disposed on the meter.

5. Device according to of claim 3, characterized in that the computing and analysis means are constituted by an electronic computer.

6. Device according to claim 5, characterized in that said electronic computer comprises a screen on which are displayed the results of the measurements carried out.

7. Device according to claim 5, characterized in that the computer is connected to a data bank permitting computerized retrieval of the results.

* * * * *